United States Patent [19]

Pennewiss et al.

[11] 3,948,866

[45] Apr. 6, 1976

[54] POLYMERIZATION WITH THE AID OF MACROMOLECULE HAVING BOTH A MONOMER SOLUBLE PORTION AND SUSPENSION SOLUBLE PORTION

[75] Inventors: Horst Pennewiss, Darmstadt; Helmut Knoell, Reichenbach uber Bensheim; Júergen Masanek, Pfungstadt uber Darmstadt, all of Germany

[73] Assignee: Rohm GmbH, Darmstadt, Germany

[22] Filed: Feb. 18, 1971

[21] Appl. No.: 116,648

[30] Foreign Application Priority Data
Feb. 27, 1970 Germany............................ 2009218

[52] U.S. Cl..... 260/79.3 MU; 252/9; 260/29.6 RW; 260/33.6 UA; 260/80 M; 260/80 P; 260/80.3 R; 260/80.3 N; 260/80.73; 260/85.5 ZA; 260/86.1 N; 260/89.5 N; 260/836; 260/875; 260/885

[51] Int. Cl.$^2$...................... C08F 15/02; C08F 15/36
[58] Field of Search 260/29.6 RW, 79.3 MU, 78.5 R, 260/80 M, 80 P, 89.7 N, 89.5 N, 86.1 N, 80.3 N, 85.5

[56] References Cited
UNITED STATES PATENTS

| | | | |
|---|---|---|---|
| 2,723,256 | 11/1955 | Hayek | 260/79.3 |
| 2,980,657 | 4/1961 | Melamed | 260/86.1 |
| 2,982,749 | 5/1961 | Friedrich | 260/23 |
| 3,239,496 | 4/1966 | Jursich | 260/89.5 |
| 3,284,393 | 11/1966 | Vanderhoff | 260/29.6 |
| 3,442,842 | 5/1969 | von Bonin | 260/29.2 |
| 3,573,263 | 3/1971 | Gill | 260/79.3 MU |

FOREIGN PATENTS OR APPLICATIONS

| | | | |
|---|---|---|---|
| 991,416 | 5/1965 | United Kingdom | 260/89.7 R |

Primary Examiner—Christopher A. Henderson, Jr.
Attorney, Agent, or Firm—Curtis, Morris & Safford

[57] ABSTRACT

A process for the suspension polymerization of ethylenically unsaturated monomers — particularly for the preparation of water-soluble polymers — wherein a liquid monomer phase is polymerized while suspended in a liquid organic suspending medium in the presence of a macromolecular stabilizing or suspending agent having a macromolecular portion or portions solvated by the liquid monomer phase and another macromolecular portion or portions solvated by the liquid organic suspending medium.

Water-soluble suspension polymers, preparable by this process, comprising quaternization products or salts of dialkylaminoalkyl esters or of dialkylaminoalkyl amides of acrylic acid or of methacrylic acid.

8 Claims, No Drawings

POLYMERIZATION WITH THE AID OF MACROMOLECULE HAVING BOTH A MONOMER SOLUBLE PORTION AND SUSPENSION SOLUBLE PORTION

The present invention relates to methods for pearl polymerizing water-soluble polymers and to the products produced thereby.

Water-soluble polymers such as the alkali metal salts of polyacrylic acid or polymethacrylic acid, polyacrylamide, polyvinyl pyrrolidone, and polymeric aminoalkyl esters of acrylic acid or methacrylic acid or their salts are more effective when used as flocking agents, sedimentation agents, and filtration agents, or as thickening agents for aqueous solutions, the higher is their molecular weight. If the heat of polymerization is effectively removed, polymers with molecular weights of several millions are obtained by the polymerization of water-soluble monomers in concentrated aqueous solution, resulting in the production of extremely high viscous to gel-like rigid solutions. Among the methods of preparing such polymers on a technical scale, a reverse pearl polymerization technique is particularly good because of the simplicity of the apparatus employed and the ease of process control. In the method, an aqueous monomer solution containing a polymerization initiator is suspended in a water-imiscible organic liquid and the system is held at the polymerization temperature.

Carrying out this process in practice entails considerable difficulties. In advance stages of the polymerization the droplets of the aqueous monomer solution pass through a stage in which they are very sticky and in which they tend to ball together and to cling to the stirrer and to the walls of the polymerization vessel. In certain cases, it has been possible to overcome this stickiness by the use of parting agents. Such agents include, for example, hydrophobized kaolin and bentonite, silanized silicic acid and other finely-divided solids, as well as soluble additives such as cellulose esterified with non-polar fatty acids, polymers of hydrophobic monomers having hydrophilic substituents, or low molecular weight surface-active agents. These materials have, however, in the past been used with only limited success. For example, they are completely insufficient for the reverse pearl polymerization of acrylic acid esters or methacrylic acid esters having a quaternary ammonium group in the alkyl portion thereof.

According to the present invention, a method has been found for the polymerization of ethylenically unsaturated monomers in a liquid phase which is suspended in a liquid nonaqueous organic medium in the presence of free radical forming initiators and suspension stabilizers. According to the invention, macromolecular stabilizers having at least one molecular portion which is solvated by the liquid monomer phase and at least one molecular portion which can be solvated by the organic medium are employed.

The suspension polymerization process according to the invention is distinguished from known pearl polymerization processes in that a continuous organic phase, rather than a continuous aqueous phase, is present. The process of the invention is distinguished from known methods of "reverse pearl polymerization" by the kind of emulsifying agents which are employed.

The liquid monomer phase, in the simplest case, can consist of a liquid monomer or monomer mixture which is insoluble or has only limited solubility in the organic medium, i.e. a monomer phase of vinyl imidazole, or N-vinyl pyrrolidone. It is sufficient that the monomer phase be liquid under the conditions of polymerization. For example, acrylamide melting at 85°C. can be used above its melting point or, when in admixture with a liquid monomer such as vinyl pyrrolidone, can also be used below its melting point, as the suspended liquid phase in a fluid medium comprising hydrocarbons.

Preferably, however, according to the process of the present invention monomers are used in the form of solutions wherein the solvent and the organic medium are chosen so that they are not miscible or have only limited miscibility. As the organic medium, aliphatic or aromatic hydrocarbons such as benzene or xylene and chlorohydrocarbons such as tetrachloroethylene are predominantly used.

Glycols such as ethylene glycol, propylene, glycol, butanediol, or di- and tri-methylene glycol, as well as glycerine, formamide, formic acid, acetonitrile, and the like can be employed as the organic solvents for the monomer phase, if the monomer to be polymerized and the polymer which is formed dissolve therein but do not dissolve in the aforementioned hydrocarbons. In addition to these requirements, the combination should not form a homogenous phase by solubilization phenomena. Also, the polymerization initiator should preferably be soluble only in the monomer phase and not in the organic medium. Undesired precipitation polymerization in the liquid organic medium is avoided if the monomers or the initiators are, at most, only soluble in trace quantities in the medium, i.e. a limited solubility of the initiator or of the monomer alone in the organic medium is not objectionable. In the same manner, the reverse case is possible, namely glycols, formamide, acetonitrile, formic acid, etc. can be used as the continuous liquid medium. The polymer is then prepared from a monomer solution in a hydrocarbon or chlorohydrocarbon.

Preferably, the monomer phase comprises an aqueous solution of a monomer and the organic medium comprises a liquid which is imiscible with water, such as an aromatic or aliphatic hydrocarbon, chlorohydrocarbon, an ester, a higher alcohol, or a higher ketone. Water-soluble monomers such as the salts (preferably the alkali metal salts) of acrylic acid, of methacrylic acid, and of maleic, fumaric, or itaconic acid, acrylamide, methacrylamide, N-vinylpyrrolidone, vinyl pyridine, and vinyl imidazole can be polymerized in systems of this kind, as can dialkylaminoalkyl esters or dialkylaminoalkyl amides of acrylic or methacrylic acid such as dimethylaminoethylmethacrylate, β-morpholinoethylacrylate, or diethylaminomethylmethacrylamide, and particularly the salts of these amino group-containing monomers with organic or inorganic acids such as acetic acid, p-toluene sulfonic acid, or mineral acids, as well as the quaternary products which are obtained from the amino group-containing monomers by reaction with alkyl halides, particularly methyl chloride, or with dimethyl sulfate or similar alkylating agents.

The concentration of the monomers in the solvent which is employed therefor is set only by the limits of their solubility. Hence, those concentrations which are desired in the polymer solution which is to be prepared are generally employed and the polymer solution is separated from the organic medium on conclusion of the polymerization. If a solvent-free polymer in the form of solid pearls is to be prepared from a monomer which is not fluid at the polymerization temperature, a solvent for the monomer is employed which boils at considerably lower temperatures than does the organic medium, or which forms an azeotropic mixture with this medium, so that it can be distillatively removed after conclusion of the polymerization. For example, suspended aqueous polymer solutions can be easily and completely dehydrated by azeotropic distillation with gasoline hydrocarbons, aromtic solvents, or chlorohydrocarbons. It is sufficient if the liquid medium only partly comprises a material boiling as an azeotrope with the solvent of the monomer phase. For example, the fluid medium can comprise a mixture of a paraffin oil and a chlorohyrocarbon. This has the advantage that, on dehydration by azeotropic distillation, non-flammable vapors are formed. A complete separation of the solvent is not necessary in many cases in order to isolate tack-free pearls. Removal of the last portions of the solvent (the polymer may have up to a 30 percent solvent content) can be foregone in these cases. However, it can be accomplished in a drying chamber, in a drum dryer, or similar apparatus.

The same compounds are employed as polymerization initiators as are used for the solution or bulk polymerization of the monomers involved, providing they are not preferentially soluble in the organic medium. For example, for the polymerization of a suspended aqueous monomer solution, alkali metal persulfates or ammonium persulfates, 4,4'-azo-bis-4-cyanopentanoic acid, or water-soluble redox systems are preferably employed. If the monomers are insoluble in the organic phase, initiators like azo-bis-isobutyronitrile, which distribute themselves between the two phases, can be employed. The initiators, which are well known in the art, are employed in the amounts and at the same temperatures as are conventional for pearl, solution, or bulk polymerization.

The maintenance of a dispersed monomer phase comprising more or less spherical particles is effected according to the invention by the presence of a special stabilizing agent, aided by a turbulent movement of the reaction mixture. The amount and the efficacy of the stabilizer must be greater, the greater is the tendency of the dispersed phase to run together to form a continuous phase or to ball together into greater aggregates. In addition to the degree of agitation of the mixture, the viscosity of the dispersed phase and the density difference between the two phases is of considerable significance. The relationships are known from conventional pearl polymerization, and are correspondingly pertinent here. The lower the degree of turbulence of the reaction mixture, the greater the viscosity of the monomer phase at the time of addition of the stabilizer, and the smaller the amount of the stabilizer, the larger are the particles formed by the monomer phase. The particle size can also be increased, inter alia, by first adding the stabilizer only after the onset of polymerization, at a time at which the viscosity of the monomer phase has already increased by the formation of polymer. Alternatively, a thickening agent can be dissolved in the monomer phase. A stabilizing agent is considered particularly suitable for the polymerizations described above if — by its use — the suspended monomer phase takes at least 15 minutes in order to separate into a layer.

The amount of the stabilizer can be kept particularly small if the density of the organic medium closely resembles the density of the monomer phase. This can be achieved rather simply by the mixing of two organic liquids, of which one has a smaller density and the other a greater density than the monomer phase. For example, with aqueous monomer phases organic media which comprise combinations of a hydrocarbon such as benzene, paraffin oil, or toluene, with a chlorohydrocarbon such as trichloroethylene or tetrachloroethane are particularly useful.

The stabilizing agents employed according to the present invention are structurally analogous to low molecular weight surface-active agents, that is they are block copolymers or graft copolymers having molecular portions of different solubility properties. These copolymers are formed so that one molecular portion or a group of similar molecular portions are solubilized by the organic medium while the remaining molecular portions are solvated by the monomer phase, so that the substances congregate at the interface between the two phases. The tendency for such congregation is particularly noticeable if the stabilizing agents are of limited solubility in both phases. Good solubility in one or both phases, in contrast, reduces the number of polymer molecules to be found at the phase interface. The solubility behavior of the stabilizers is essentially determined by the relative numbers of molecular parts of different solubility characteristics. If the solvophobic portion of the molecule is disproportionately small with respect to the solvophilic portion, the tendency of the material to accumulate at the phase interface will decrease and the efficacy of the materials as emulsifying agents will decrease. The molecular weight ratio between the molecular portions of different solvation characteristics should preferably be between 10:1 and 1:10, and is preferably between 2:1 and 1:2.

The choice of monomers which comprise the different molecular parts of the stabilizer depends only on the solubility characteristics of the monomers toward the phase in question. Hydrophilic molecular portions are formed from water-soluble monomers. These water-soluble monomers can be of the neutral, anionic, or cationic type. Neutral water-soluble monomers include, for example, acrylamide and methacrylamide or vinyl pyrrolidone. Polyvinyl alcohol and polymers containing units of vinyl alcohol, as well as polymers of ethylene oxide and propylene oxide, also form hydrophilic molecules. Anionic monomers include the water-soluble salts, particularly the alkali metal salts, of at least copolymerizable carboxylic acids or sulfonic acids, as well as the corresponding free acids themselves, e.g. acrylic acid, methacrylic acid, fumaric, maleic, and itaconic acid, methacryltaurine, vinyl sulfonic acid, and m-styrene-sulfonic acid. Suitable cationic monomers include, for example, vinyl pyridine, vinyl imidazole, vinyl imidazoline, homologs of these compounds, amino alkyl esters of acrylic acid or methacrylic acid, particularly those having tertiary amino groups such as dimethylaminoethyl methacrylate, and the water-soluble salts and quaternary ammonium compounds which can be prepared therefrom. Also, polymers of ethylene imine can form the hydrophilic portion of the stabilizers.

To a limited extent, monomers forming water-insoluble homopolymers can take part in the formation of hydrophilic polymer chain segments or graft polymer branches, for example monoesters of acrylic acid or methacrylic acid with lower aliphatic polyols such as ethylene glycol, propylene glycol, butanediol-1,4, or glycerine, or more or less hydrophobic monomers such as alkyl acrylates or methacrylates, styrene, vinyl esters, and the like. Monomers of this sort should be used in smaller amounts the more hydrophobic they are and the less hydrophilic are the remaining monomers. For example, a copolymer comprising 70 parts of methyl acrylate and 30 parts of sodium acrylate is still water-soluble. However, if methacrylamide is employed as the monomer imparting hydrophilicity, the hydrophilic molecular portion should contain no more than 20 percent of a water-insoluble monomer copolymerized therein.

Surprisingly, the ionic character of the monomers to be polymerized in a suspended aqueous phase need not be taken into consideration in choosing the hydrophilic molecular portion of the stabilizing agent. Thus, a solution of a cationic monomer can be polymerized in the presence of a stabilizer having an anionic, cationic, or non-ionic hydrophilic molecular portion. The same is true for anionic monomers.

For liquid phases of the polymerization system which have a less hydrophilic and a stronger hydrophobic character, stabilizer components having an exactly appropriate solvophilic character can be prepared by a suitable choice of starting materials. The following Table presents groups of suitable solvophilic molecular portions for several groups of nonaqueous liquid phases. There is a certain interchangeability between the vertically separated groups, even if, within each group, the tendency to form a hydropholic component generally increases from top to bottom.

| Liquid Phase | Solvophilic Molecular Portion Polymer chains of: |
|---|---|
| Lower alcohols<br>Formamide<br>Acetonitrile | Acrylic acid or methacrylic acid<br>Fumaric, maleic, or itaconic acid<br>Methacryltaurene<br>Vinyl sulfonic acid<br>m-styrenesulfonic acid<br>Vinyl pyrrolidone<br>Vinyl imidazoline<br>Vinyl imidazole<br>Vinyl pyridine<br>N-vinylpyridone<br>Dimethylaminoethylmethacrylate |
| Glycerine<br>Ethylene glycol<br>Propylene glycol<br>Butylene glycol<br>Butanediol-1,4 | Polyvinyl alcohol<br>Polyethylene oxide<br>Polypropylene oxide |
| Higher Alcohols ($C_6$—$C_{12}$)<br>Cyclohexanol | Polymers or copolymers of hydroxyethylacrylate or hydroxyethylmethacrylate<br>Hydroxypropylacrylate or hydroxypropylmethacrylate<br>Butanediol-monoacrylate or butanediol-methacrylate<br>Hexanediol-monoacrylate or hexanediol-monomethacrylate |
| Chloroform<br>Carbon tetrachloride<br>Trichloroethylene<br>Tetrachloroethylene<br>Tetrachlorethane | Methylacrylate<br>Ethyl acrylate<br>Butyl acrylate<br>Butyl methacrylate<br>Isobutylacrylate or isobutyl-methacrylate |
| Ethylacetate<br>Butylacetate<br>Methylpropionate<br>Acetone<br>Methylethylketone<br>Methylisobutylether | Vinyl acetate<br>Vinyl propionate<br>Vinylbutyrate<br>Styrene |
| Benzene<br>Toluene<br>Xylene<br>Decalin | Styrene<br>Vinyltoluene<br>α-methylstyrene<br>Hexylacrylate or hexylmethacrylate |
| Gasoline hydrocarbons | 2-ethyl-hexyl-acrylate or 2-ethyl-hexyl-methacrylate |
| Petroleum ether | Decyl-, Dodecyl-, Octadecyl-acrylate or -methacrylate, -fumarate, -maleate<br>Vinyloctoate |
| Paraffin oils | Vinylesters of "versatic acids"<br>Vinyl stearate |

For those liquid phases or solvophilic molecule portions which are not mentioned in this Table, the well known rule that "like dissolves like" can be widely used. The polar character of the monomer phase, however, will be influenced not only by the solvent which is employed but also by the polar character of the monomer or monomer mixture as the content thereof in the solvent increases. The more strongly the monomer or monomer mixture determines the polar character of the monomer phase, the sooner is the corresponding polymer to be viewed as a suitable solvophile for the monomer phase when chain portions comprising the polymer are present in a stabilizer. There are exceptions to this rule: the polymer of acrylonitrile, for example, is insoluble in the monomer. Monomer phases which wholly or predominantly comprise only monomers are to be entered into the foregoing Table according to their polar character.

A number of possibilities are available for bonding molecular portions having different solvent characteristics (or their monomeric precursors) to form block or graft copolymers effective as a dispersing agent. Several typical processes for the preparation of graft copolymers are described below.

1. Free-radical sites are formed on a backbone polymer by irradiation thereof or under the influence of free radicals formed from polymerization initiators. Grafted branches are formed on these sites in the presence of a grafting monomer. A non-grafted polymer of the grafting monomer or monomers is formed in addition to the graft polymer, usually in a predominant amount. This polymer has no effect as a dispersing agent and when the stabilizing agent is used it dissolves in that phase in which it is more soluble. Because of this undesired side effect, the use of stabilizers obtained by random grafting is not the preferred embodiment of the invention.

2. A significantly greater portion of grafted copolymer is obtained if the grafting monomer is copolymerized with a backbone polymer which contains reactive side groups. The preparation of such copolymers is well known in the art and is usually accomplished by the reaction of a polymer containing a reactive group with a compound which has both a complementary reactive group and a double bond which can be polymerized by a free radical reaction. Suitable reactive groups for the polymer are, for example, carboxylic acid anhydride, carboxylic acid chloride, carboxy, epoxy, isocyanate, or azlactone groups; as complementary groups, hydroxy, amino, or hydrazine groups are suitable. For example, copolymers containing maleic acid anhydride, itaconic acid anhydride, acrylic acid chloride, methacrylic acid chloride, glycidyl acrylate, glycidyl methacrylate, vinyl isocyanate, or 2-isopropenyl-4,4-dimethyl-oxazolono-5 react with allyl alcohol, hydroxyalkyl esters of acrylic acid or methacrylic acid, acrylic acid ethanolamide or methacrylic acid ethanolamide, methylol acrylamide, methylol methacrylamide, amino alkyl esters of acrylic acid or methacrylic acid, or acrylic acid hydrazide or methacrylic acid hydrazide. If the polymer contains units of acrylic, methacrylic, maleic, fumaric, or itaconic acid, most of the above-mentioned reactions are possible under sufficiently energetic reaction conditions. The preparation of polymer having unsaturated side groups is possible by reversing the reactive groups, i.e. the last-named monomers are incorporated into the polymer and are reacted with the free monomers described above as components of the polymers. Finally, backbone polymers of this type suitable for "directed" graft copolymerization can be prepared in one step if monomers having two unsaturated double bonds of different reactivity are subjected to copolymerization under conditions in which predominantly only one of the double bonds is involved in polymerization. Suitable monomers of this type are, for example, allyl acrylate and allyl methacrylate. The unreacted double bonds become active sites for grafting.

By free radical polymerization of the graft monomers in the presence of a backbone polymer having unsaturated side groups, a graft copolymer-like product is obtained. The degree of polymerization of the graft chains is adjusted, for example by the addition of chain transfer agents, so that it corresponds approximately with the quotient formed by the number of equivalents of grafting monomers over the number of equivalents of unsaturated side groups in the total backbone polymer. At higher degrees of polymerization, cross-linking occurs whereas lower degrees of polymerization lead to formation of polymers of the grafting monomer which are not bound to the backbone polymer.

3. The condensation or addition reactions described under (2) above can be used to join entire molecule portions of different solubility characteristics to each other. In this process, two polymers of different solvent characteristics, but having complementary reactive groups, are prepared independently and are then reacted. At least one of the polymers should have no more than one reactive group per macromolecule, on the average, in order to avoid cross-linking.

4. Specially advantageous graft copolymers are prepared from backbone polymers containing azo groups or peroxy groups which, on free radical decomposition in the presence of a grafting monomer, form reactive sites for grafting branches. Two types of backbone polymer can be distinguished here, namely: (A) those polymers in which the azo groups or peroxy groups are bound to a macromolecule only on one side thereof (see A below in which the term "initiator" signifies a group which contains an azo group or peroxy group, perhaps with further atomic groups); and (B) those polymers in which the azo groups or peroxy groups are bound to each of two macromolecular chains (see B below).

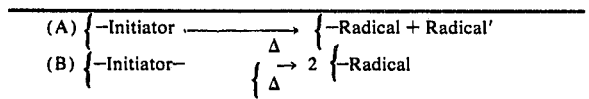

In Case B, decomposition of the initiator group forms two free radical sites, each bound to a macromolecule, which can serve as the starting point for a free radical branch. In contrast, in case (A), a free radical (Radical') is formed in addition to the radical bound to the macromolecule and initiates a non-grafted polymer chain. In case the non-grafted polymer fraction interferes, an initiator-containing backbone polymer of type B is employed.

The preparation of such an initiator group-containing backbone polymer must take place under conditions under which the azo groups or peroxy groups do not decompose. If the backbone polymer is prepared from a unsaturated free radical-polymerizable monomer having an azo group or peroxy group by means of free radical copolymerization, then a free radical initiator is used which has a decomposition temperature significantly lower than that of the azo or peroxy groups. Suitable polymers containing polymerizable initiator groups, as well as the conditions under which they can be polymerized without decomposition of such groups are described, for example, in German patent publication No. 1,055,240. Polymerizable derivatives of azo-bis-isobutyric acid-monoamide, azo-bis-isobutyric acid-diamide, and of the corresponding monohydrazide or dihydrazide are employed with particular advantage in preparing such backbone polymers, since the azo groups therein have decomposition temperatures above 100°C. and yet the monomers are copolymerizable below these temperatures in the presence of conventional polymerization initiators. Such derivatives are, for example,

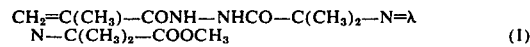 (I)

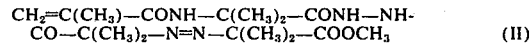 (II)

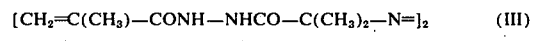 (III)

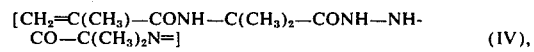 (IV), in which the molecular portion containing the hydrocarbon double bond is derived from methacrylic acid chloride in compounds I and III, and from 2-isopropenyl-4,4-dimethyloxazolone-5 in compounds II and IV. The molecular portion containing the azo group is derived from azo-bis-isobutyric acid-monohydrazidemonomethylester in compounds I and II, and from azo-bis-isobutyric acid-dihydrazide in compounds III and IV.

A backbone polymer comprising units of monomers of formulas I - IV can also be obtained by the reaction of copolymers of acrylic acid chloride, or methacrylic acid chloride, or of 2-isopropenyl-4,4-dimethyl-oxazolone--dimethyl-oxazolone-with one of the aforementioned azo-bis-isobutyric acid-hydrazides. This method of synthesis can, naturally, also be performed using compounds incorporating azo groups or peroxy groups in other ways, or with backbone polymers containing reactive groups of a different type, for example containing copolymerized units of methacrylic acid anhydride or maleic acid anhydride groups.

Block copolymers suitable as stabilizers can be obtained according to the following processes, given by way of example:

1. By the reaction of shearing forces (mastication) on a polymer in the presence of a monomer of a different solubility type, free radical sites arise by chain breaking, on which free radical sites a polymer chain of the monomer can be formed.

2. Polymers of different solvent characteristics are masticated together. By free radical-forming chain break of the polymer molecules and recombination with fragments of the other polymer, block copolymers are formed.

3. Two polymers of different solvent characteristics with complementarily reactive end groups are reacted with one another with formation of a block polymer. For example, one of the polymers can be prepared using mercapto acetic acid as a chain regulator or 4,4'-azo-bis-4-cyanopentanoic acid as the initiator. The other can be prepared in the presence of mercapto ethanol. On heating, preferably in the presence of an acid catalyst, the carboxy groups of the first polymer react with the hydroxy groups of the second polymer with the formation of ester groups.

4. A water-insoluble monomer is suspended in the form of droplets in an aqueous solution of a monomer which contains an initiator which is soluble only in water, such as potassium persulfate. On polymerization of the water-soluble monomer in the aqueous phase, the growing chain ends can penetrate the phase boundary to the droplet of the suspended monomer and grow therein with the formation of a fragment comprising the suspended monomer. Homopolymers of the two monomer types are always formed as a by-product. These generally do not influence the emulsifying properties of the block copolymer but can be easily separated by selective extraction if desired.

The amount of the block copolymer or graft copolymer employed as a stabilizing agent is, in general, between 0.01 and 10 percent by weight of the monomer or monomer mixture to be polymerized. The preferred amount is between 0.1 and 2 percent by weight.

It is advantageous to combine the stabilizing agent with the liquid organic medium and then to introduce thereinto, with vigorous stirring, a monomer phase already containing an added polymerization initiator.

In this manner the monomer phase is broken up into substantially spherical droplets of a diameter of 0.1 – 3 mm. However, the sequence in which the components are combined is in no way critical and can deviate from the process here described. The temperature of the reaction mixture is held as constant as possible during the polymerization. In general, a water-cooled jacket suffices for removing the heat of polymerization. However, for large reaction vessels the use of a built-in cooling coil or of a cooled stirrer can be of advantage. The polymerization time is, as known in the art, dependent on many factors. In a typical case, it can be from 2 to 4 hours after about a 1 hour-long induction period. When a solvent-free monomer phase is employed the reaction product precipitates in the form of solid pearls of the polymer. If a monomer phase containing water or some other solvent is employed in the polymerization, pearls can be recovered by removing the solvent by distillation or by some other means. The polymer pearls can be filtered off or can be dissolved by the addition of a suitable solvent.

Although the process of the present invention is employed with particular advantage for the preparation of water-soluble polymer products useful as flocking agents, sedimentation agents, dyeing auxiliaries, antistatic agents, thickening agents, hair spray resins, water-soluble binders, and the like, in principle no class of polymer product is excluded from this method of preparation. For example, resin masses for the preparation of shaped bodies, fibers or films, auxiliary agents for other deformable resins, coating and binding agents, adhesives, viscosity index improvers for lubricating oils, textile auxiliaries such as dressing and finishing agents, and still other polymers can be prepared according to the invention.

A better understanding of the present invention and of its many advantages will be had from the following specific Examples given by way of illustration. The suspension stabilizers used in the Examples are prepared according to methods (A) – (F) described below. All parts are by weight.

A. 25 parts of butyl methacrylate are suspended with vigorous stirring in a solution comprising 25 parts of trimethyl-$\beta$-methacryl-oxyethyl-ammonium chloride, 2 parts of a copolymer formed from equal portions of dimethylaminoethyl methacrylate and butyl methacrylate, and 0.2 part of 4,4'-azo-bis-4-cyanopentanoic acid in 75 parts of water. The mixture is warmed at 70°C. for three hours under a $CO_2$ atmosphere and, after addition of a further 0.14 part of initiator, is heated for a further hour at 75°C. A viscous white dispersion of about 40 percent polymer content is formed. A viscosity $\eta_{sp}/c = 0.6$ is determined for the polymer at 20°C. using a 1 percent solution in an ethylene glycol-dioxane mixture (96.5:3.5).

B. 29.1 parts of butyl methacrylate, 0.9 part of -azo-bis-N-(methacrylaminoisobutyryl)-isobutyric acid hydrazide (prepared from 2 mols of 2-iso-propenyl-4,4-dimethyloxazolone-5 and 1 mol of azo-bis-isobutyric acid hydrazide), and 0.3 part of azo-bis-isobutyric acid ethyl ester are dissolved in 70 parts of ethylene glycol and warmed at 80°C. for four hours under a $CO_2$ atmosphere. Then, a solution of 20 parts of trimethyl-$\beta$-methacryl-oxyethyl ammonium-chloride in 47 parts of ethylene glycol is added and the mixture is heated to 115°C. for four hours. A cloudy whitish solution having a solids content of 30 percent and a viscosity of 1500 centipoises is obtained. centipoises C. The process described above under (B) is repeated with the exception that, instead of butyl methacrylate, a mixture of this ester with $\beta$-hydroxypropyl acrylate (weight ratio 23.1:6) is employed The solution obtained has a viscosity of 1750 centipoises.

D. The process described under (B) above is repeated with the difference that, in place of the solution of trimethyl-$\beta$-methacryloxyethyl-ammonium chloride, a solution of 12.9 parts of acrylamide in 30 parts of ethylene glycol is used.

The 30 percent solution obtained has a viscosity of 1500 centipoises.

E. The process described above under B is repeated with the exception that, in place of trimethyl-$\beta$-methacryloxyethyl-ammonia-chloride, the same amount of methacrylic acid is employed.

The 30 percent solution obtained has a viscosity of 1200 centipoises.

F. 36 parts of decylmethacrylate, 4 parts of isopropenyl-4,4-dimethyl-oxazolone-5, and 0.5 part of t-butyl-peroctoate are dissolved in 60 parts of white spirits and the solution is heated at 80°C. for 4 hours under a $CO_2$ atmosphere. The polymer solution obtained is combined with a solution of 84 parts of ethyl acrylate, 9.5 parts of 2-hydroxypropylacrylate, and 2 parts of azo-bis-isobutyric acid hydrazide dissolved in a mixture of 120 parts of solvent naphtha and 20 parts of glacial acetic acid. On warming the reaction mixture, the azobis-isobutyric acid hydrazide adds to the 4,4-dimethyloxazolone-5 groups of the polymer formed in the first step. By heating for four hours at 115°C., a cloudy white solution of 39 percent solids content having a viscosity of 190 centipoises is formed. For the graft copolymer, a viscosity $\eta_{sp}/c = 0.05$ is found in chloroform at 20°C.

In all of the following Examples, the suspension polymer is formed as follows: The organic phase, with the stabilizer dissolved therein, is introduced into a stirred vessel. After displacement of the air by an inert gas, the monomer phase is added with vigorous stirring (300 rpm). Polymerization generally begins after ½ to 1½ hours and is concluded after 3 hours.

If the monomer phase contains water, this is removed azeotropically after conclusion of the polymerization until hard tack-free pearls are obtained. In Examples 5 and 6, the solvent-free polymer is obtained directly. The polymer pearls obtained according to Examples 7 and 8 are freed of solvent by washing with acetone. The details of Examples 1 – 25 are given in the following Tables I and II.

TABLE I

Composition of the Phases
TMAC = Trimethyl-β-methacryloxyethyl-ammonium-chloride
*Boiling range 80° – 110°C.

| Example No. | Monomer Phase (Mixing Ratio in Parts by Weight) | Fluid Organic Phase (Mixing Ratio in Parts by Weight) |
|---|---|---|
| 1 | Acrylamide/TMAC (80:20), 60 percent in water | Tetrachloroethylene/n-hexane (66:34) |
| 2 | Trimethyl-β-methacryloxyethylammonium-methosulfate, 70 percent in water | Tetrachloroethylene/gasoline* (52:48) |
| 3 | Trimethyl-β-methacryloxyethylammonium-methosulfate/acrylamide (80:20), 60 percent in water | Tetrachloroethylene/gasoline* (52:48) |
| 4 | Methacrylic acid/urea (50:50), 67 percent in water | Xylene |
| 5 | 2-hydroxyethylacrylate/acrylamide (50:50), solvent-free | Gasoline* |
| 6 | N-Vinylimidazole, acrylamide (50:50), solvent-free | Gasoline* |
| 7 | Methacrylic acid, 60 percent in formamide | Tetrachloroethylene/n-hexane (67:33) |
| 8 | Methacrylic acid/methacrylonitrile (70:30), 50 percent in formamide | Tetrachloroethylene/n-hexane (67:33) |
| 9–10 | TMAC, 75 percent in water | Benzene |
| 11 | TMAC, 75 percent in water | Toluene |
| 12 | TMAC/acrylamide (20:80), 75 percent in water | Benzene |
| 13–14 | TMAC/acrylamide (80:20), 75 percent in water | Benzene |
| 15 | TMAC/dimethylaminoethyl-methacrylate-hydrochloride (20:80), 75 percent in water | Benzene |
| 16 | TMAC/acrylamide/methacrylamide (20:40:40), 70 percent in water | Benzene |
| 17 | TMAC/sodium-methacrylate (50:50), 50 percent in water | Benzene |
| 18 | Acrylamide/sodium methacrylate (70:30), 53.5 percent in water | Benzene |
| 19 | Sodium methacrylate, 40 percent in water | Benzene |
| 20 | Sodium acrylate, 36 percent in water | Benzene |
| 21 | Sodium acrylate/sodium methacrylate (47:53), 44 percent in water | Benzene |
| 22 | Sodium acrylate/sodium methacrylate (80:20), 40 percent in water | Benzene |
| 23 | TMAC/sodium methacrylate (50:50), 70 percent in water | Benzene | mixture is heated to 70°C. and the initiator-containing

TABLE II

| Example No. | Phase Relationship Liquid Medium/Monomer Phase (Parts by Volume) | Polymerization Conditions | | | | | Viscosity of a 1% Aqueous Solution of the Polymer in Centipoises at 20°C. |
|---|---|---|---|---|---|---|---|
| | | Stabilizer Amount (1) | Kind (2) | Initiator Amount (1) | Kind (3) | Regulator(4) Amount (1) | |
| 1 | 2.5:1 | 0.5 | A | 0.03 | ACP | 0.005 | 2000 |
| 2 | 2.5:1 | 0.5 | A | 0.02 | ACP | — | 2500 |
| 3 | 2.5:1 | 0.5 | A | 0.02 | ACP | 0.005 | 1500 |
| 4 | 2.5:1 | 5.0 | A | 0.05 | ACP | — | 45 |
| 5 | 7:1 | 5.0 | F | 0.05 | ACP | 0.5 | 4 |
| 6 | 7:1 | 5.0 | F | 0.05 | ACP | 0.1 | 400 |
| 7 | 2.5:1 | 1.0 | A | 0.05 | ACP | — | 500(5) |
| 8 | 2.5:1 | 1.5 | A | 0.25 | ABE | — | — |
| 9 | 9:1 | 20 | B | 0.5 | APS | — | 500 |
| 10 | 4:1 | 10 | C | 0.01 | APS | — | 400 |

TABLE II-continued

| Example No. | Phase Relationship Liquid Medium/ Monomer Phase (Parts by Volume) | Polymerization Conditions | | | | | Viscosity of a 1% Aqueous Solution of the Polymer in Centipoises at 20°C. |
| --- | --- | --- | --- | --- | --- | --- | --- |
| | | Stabilizer Amount (1) | Kind (2) | Initiator Amount (1) | Kind (3) | Regulator(4) Amount (1) | |
| 11 | 2:1 | 2 | A | 0.01 | APS | — | 2200 |
| 12 | 3:1 | 10 | C | 0.025 | Npy | — | 600 |
| 13 | 2:1 | 2 | A | 0.01 | APS | — | 5400 |
| 14 | 2:1 | 2 | E | 0.01 | APS | — | 600 |
| 15 | 2:1 | 2 | A | 0.01 | APS | — | 2200 |
| 16 | 2:1 | 2 | A | 0.01 | APS | — | 1500 |
| 17 | 2.5:1 | 2 | A | 0.02 | APS | — | 400 |
| 18 | 2.5:1 | 5 | A | 0.05 | APS | — | 1000 |
| 19 | 2.5:1 | 3 | A | 0.05 | APS | — | 80 |
| 20 | 2.4:1 | 3 | A | 0.05 | APS | — | 15000 |
| 21 | 2.5:1 | 5 | A | 0.05 | APS | — | 2400 |
| 22 | 2.5:1 | 2 | E | 0.03 | APS | — | 8200 |
| 23 | 2.5:1 | 2 | E | 0.02 | APS | — | 500 |

(1) Amount in percent by weight of monomer
(2) See preparation methods A – F above
(3) ACP = 4,4'-Azo-bis-4-cyanopentanoic acid; ABE = Azo-bis-iso-butyric acid ethyl ester; APS = Ammonium persulfate; NPy = Sodium pyrosulfite (Polymerization at 30°C.).
(4) Mercaptoethanol
(5) Measured as the sodium salt

What is claimed is:

1. In a process for the polymerization of ethylenically unsaturated monomers in a liquid monomer phase suspended in a liquid organic suspending medium, in the presence of a free radical forming initiator and of a suspension stabilizer, the improvement wherein said suspension stabilizer is a graft copolymer or block copolymer formed between at least two different vinyl, vinylidene, or alkylene oxide monomers, said graft or block copolymer having at least one macromolecular portion which is solvated by said liquid monomer phase and at least one macromolecular portion which is solvated by said liquid organic suspending medium.

2. A process as in claim 1, wherein said liquid monomer phase is a monomer or monomer mixture liquid at the polymerization temperature.

3. A process as in claim 1 wherein said liquid monomer phase is a solution of (A) a monomer or monomer mixture insoluble or of only limited solubility in the liquid organic suspending medium at the polymerization temperature in (B) a liquid which is imiscible or is of only limited miscibility with the liquid organic suspending medium at the polymerization temperature.

4. A process as in claim 3 wherein said liquid monomer phase is an aqueous solution of a monomer or monomer mixture.

5. A process as in claim 1 wherein the sum of molecular weights of the macromolecular portions of said macromolecular suspension stabilizer solvated by the liquid monomer phase to the sum of the molecular weights of its macromolecular portions solvated by the liquid organic suspending medium is in the ratio of 10:1 to 1:10.

6. A process as in claim 1 wherein the density of the liquid organic suspending medium and the density of the monomer phase are substantially the same.

7. A process as in claim 1 wherein said liquid organic suspending medium is a mixture of an aliphatic or aromatic hydrocarbon and an aliphatic chlorohydrocarbon.

8. A process as in claim 7 wherein said liquid organic suspending medium is a mixture of an aliphatic hydrocarbon and perchloroethylene.

* * * * *